No. 11,897. Reissued Mar. 12, 1901.
N. I. MILLIKEN.
SHOVELING BOARD.
(Application filed Feb. 2, 1901.)
2 Sheets—Sheet 1.
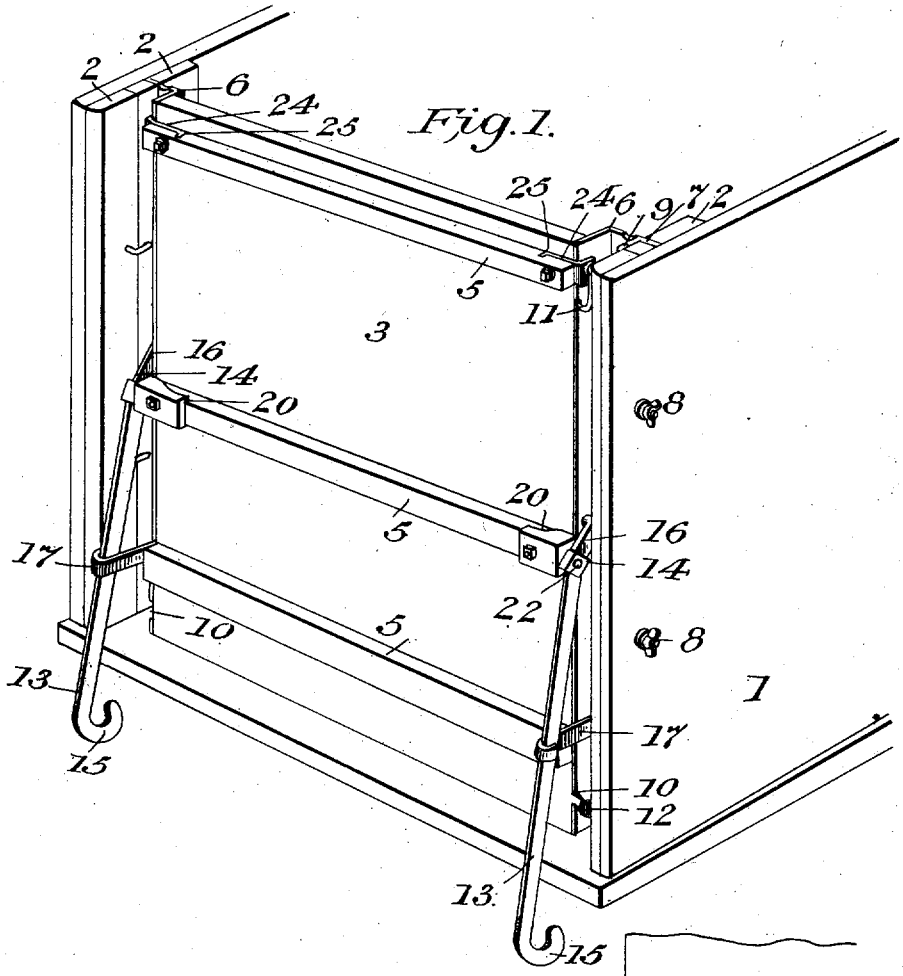
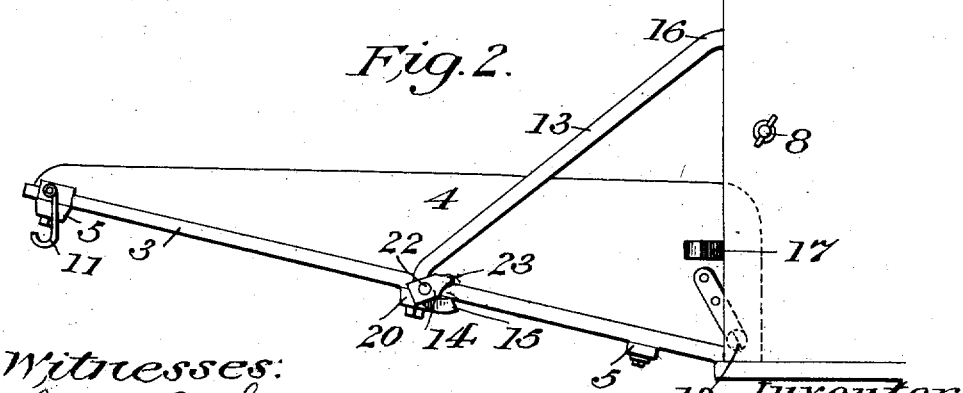
Witnesses:
Gladys L. Thompson.
Genevieve Matthews.
Inventor.
Norman I. Milliken,
By Thos. A. B. Lacey, his Attys.
THE NORRIS PETERS CO., PHOTO-LITHO., WASHINGTON, D. C.

No. 11,897. Reissued Mar. 12, 1901.

N. I. MILLIKEN.

SHOVELING BOARD.

(Application filed Feb. 2, 1901.

2 Sheets—Sheet 2.

Witnesses:
Gladys L. Thompson
Genevieve Matthews

Inventor:
Norman I. Milliken,
By R. S. A. Lacey, his Atty.

THE NORRIS PETERS CO., PHOTO-LITHO., WASHINGTON, D. C.

UNITED STATES PATENT OFFICE.

NORMAN I. MILLIKEN, OF DEKALB, ILLINOIS.

SHOVELING-BOARD.

SPECIFICATION forming part of Reissued Letters Patent No. 11,897, dated March 12, 1901.

Original No. 664,662, dated December 25, 1900. Application for reissue filed February 2, 1901. Serial No. 45,661.

*To all whom it may concern:*

Be it known that I, NORMAN I. MILLIKEN, a citizen of the United States, residing at Dekalb, in the county of Dekalb and State of Illinois, have invented certain new and useful Improvements in End-Gates and Shoveling-Boards; and I do hereby declare the following to be a full, clear, and exact description of the invention, such as will enable others skilled in the art to which it appertains to make and use the same.

This invention relates to tail-closures for wagon-bodies of the type adapted to be used as an end-gate and a shoveling-board, the improvement residing in the novel form of connections and mountings, which admit of the closure being readily shifted from one position to the other or removed entirely, as may be required.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment of the invention is illustrated in the accompanying drawings, in which—

Figure 3:
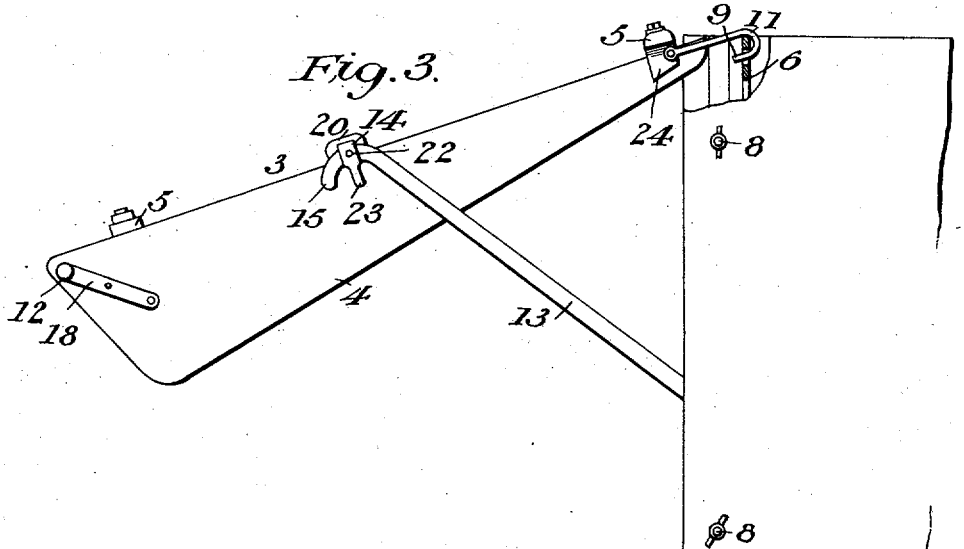
Figure 4:
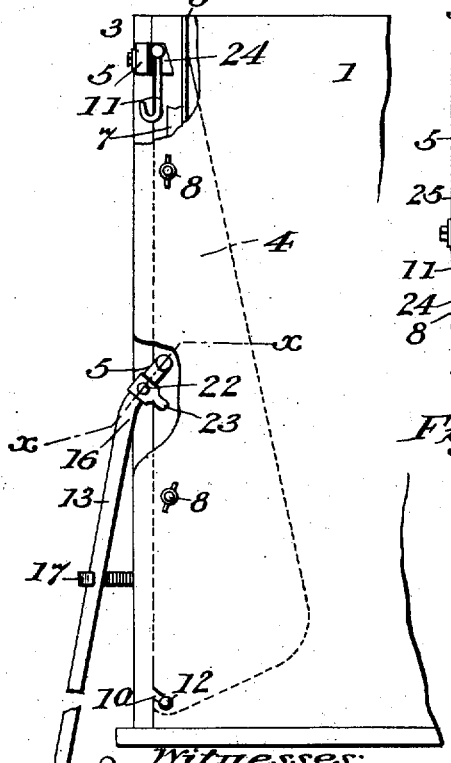
Figure 5:
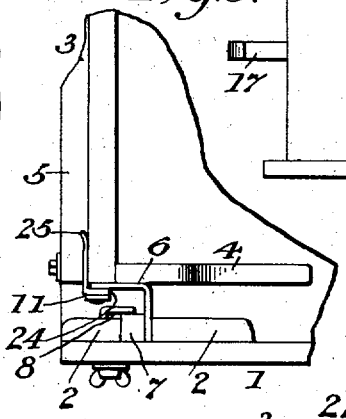
Figure 7:
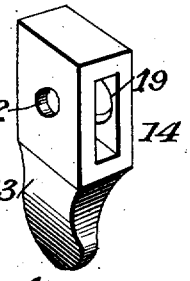
Figure 6:
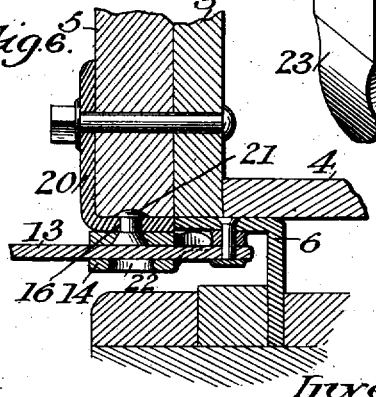

Figure 1 is a perspective view showing the end-gate closed. Fig. 2 is a detail view showing the end-gate in position for use as a shoveling-board. Fig. 3 is a view showing the end-gate swung outward at the bottom. Fig. 4 is a detail view in elevation, showing the relation of the parts when the end-gate is closed. Fig. 5 is a top plan view. Fig. 6 is an enlarged section on the line X X of Fig. 4. Fig. 7 is a detail view of the runner.

Corresponding and like parts are referred to in the following description and indicated in all the views of the drawings by the same reference characters.

The sides 1 of the wagon-body are provided near their rear ends with spaced cleats 2, vertically arranged and attached to the boards comprising the said sides in any substantial manner. The tail-closure 3, constituting the end-gate and the shoveling-board, is provided with tapering sides 4, constituting guards to prevent the contents falling over the sides of the part 3 when used in the capacity of a shoveling-board. The part 3 will be designated as the "end-gate," since it is used primarily in this capacity and is stiffened and strengthened transversely by a series of cleats 5.

Guide-bars 6 are secured to the rear ends of the sides 1 and consist, preferably, of angle-irons, one leaf or wing being spaced from said sides and the other wing being attached thereto, preferably by means of wooden strips 7 and hook-bolts 8, the latter passing through the sides 1 and their hooked ends engaging the inner sides of the wooden strips 7, which are firmly attached to the outermost edge of the transverse wings of the angle guide-bars 6. By loosening the nuts applied to the outer ends of the hook-bolts 8 the latter can be turned so as to liberate the wooden strips 7, thereby admitting of said strips and the attached guide-bars 6 being removed or placed in position, as will be readily understood. The wooden strips 7 are fitted snugly in the space formed between the spaced cleats 2. An opening 9 is formed in the upper end of each guide-bar 6 and a curved slot 10 is provided at the lower end of each guide-bar. Hooks 11 are applied to the upper end of the end-gate 3 and are adapted to engage with the openings 9 of the guide-bar 6, so as to hold the upper end of the tail-gate to the wagon-body when the lower end is swung outward, as shown in Fig. 3. Headed studs 12 are provided at the lower end of the end-gate and at the sides thereof to coöperate with the curved slots 10 and hold the lower end of the gate to the wagon-body when the upper end is swung outward, as shown in Fig. 2, and also to hold the end-gate in position when closed, as indicated in Fig. 4. The hooks 11 also serve to hold the end-gate closed against outward pressure from within.

Levers 13 have pivotal connection at their upper ends with the guide-bars 6 and pass through runners 14, having swivel connection with the middle portion of the end-gate. These levers terminate at their free ends in hooks 15 and have bent portions 16 at their pivotal ends to coöperate with the runners 14 and prevent vertical displacement of the end-gate when the levers 13 are fastened. Catches 17 are provided near the lower ends of the sides 1 and are adapted to engage with the levers 13 and hold them against casual displacement when the end-gate is closed. As indicated most clearly in Fig. 4, the runners 14 receive the lower ends of the bent portions 16 of the levers, and when the latter are fastened it is practically impossible to elevate the end-gate and effect disengagement of the headed studs 12 from the curved slots 10. The hooks 15 constitute grips to be grasped when it is required to utilize the levers 13 when free from the catches 17 as means for elevating the end-gate and disengaging the headed studs from the curved slots 10. These hooks also limit the downward movement of the end-gate and support it in the position shown in Fig. 2, when it can be used as a shoveling-board. The catches 17 are short bars secured to the wagon-body and extended rearwardly therefrom and having hooks at their rear ends to engage the levers 13. When engaging the levers with the ends of the catches 17 or when disengaging them therefrom, considerable force must be exerted to cause the said levers to clear the terminals of the hooked ends of said catches in order that the engagement or the disengagement may be effected by a lateral movement of said levers, as will be readily comprehended. The headed studs 12 may be attached to the end-gate in any desired manner, and, as shown, they are applied to strap-irons 18, which are let into the sides or guards 4.

The runners 14 are blocks of oblong formation and provided with slots 19, through which the levers 13 are adapted to run or slide, and these blocks have a swivel connection with metal tips 20, applied to the middle cleat 5 of the end-gate. A pivot-fastening 21 is passed through transverse openings 22, intersecting the slot 19, and is concealed from view by means of a lever. In order that the head of the pivot-fastening may not obstruct the slot 19 or interfere with the free workings of the parts 14 and 13, its head is countersunk in the inner or remote side of the runner. Each runner is provided with an extension 23, which is adapted to engage with the adjacent guide-bar 6 in such a manner as to prevent outward displacement of the sides 1 when subjected to great pressure from within. The runners 14 are adapted to slide freely upon the levers, and their swivel connection with the metal tips 20 admits of their turning to prevent any binding between the parts 13 and 14.

Clips 24 are applied to the upper end of the gate 3 and are adapted to engage over the guide-bars 6 and prevent outward displacement of the sides 1 when subjected to outward pressure. These clips are rigidly attached to the end portions of the topmost cleat 5, and their inner ends are bent, as shown at 25, to enter grooves formed in the inner side of the cleat 5, whereby the strain is materially removed from the fastening-bolt and from the body of the end-gate. The hooks 11 are preferably attached to the clips 24 for the sake of strength and durability.

When the end-gate is closed, the headed studs 12 are received in the curved slots 10, and the extensions 23 of the runners 14 engage with the guide-bar 6, and the levers 13 are held fast by the catches 17. The sides 1 are prevented from spreading by the clips 24 and extensions 23 engaging with the guide-bar 6, and upward displacement of the end-gate is guarded against by the runners 14 and the inclined portions 16 of the runners 14 in the manner stated. When it is required to permit the end-gate to swing outward at its lower end, the hooks 11 are engaged with the openings 9 and the levers 13 are disengaged from the catches 17 and are lifted, so as to withdraw the headed studs 12 from the curved slots 10, when the end-gate will swing outward, as indicated in Fig. 3. By disengaging the hooks 11 from the opening 9 and retaining the headed studs 12 in engagement with the curved slots 10 the gate is adapted to be swung outward and downward at its upper end into the position shown in Fig. 2, when it is adapted for use as a shoveling-board.

From the foregoing it will be seen that the end-gate can be readily applied to any form of wagon-body and can be detached therefrom or shifted to any position, the connections and mountings being such as to admit of the attainment of the several results in a simple and effective manner.

Having thus described the invention, what is claimed as new is—

1. In combination with a wagon-body, and an end-gate adapted to have a vertical and a pivotal movement with reference to the wagon-body, levers pivotally connected with the wagon-body and having bent or deflected portions at their pivotal ends, and runners having swivel connection with the end-gate and sliding connection with said levers and adapted to coöperate with the bent portions thereof to prevent vertical displacement of the end-gate, substantially as specified.

2. In combination with a wagon-body and an end-gate, guide-bars secured to the sides of the wagon-body near their rear ends, levers pivotally connected with the wagon-body, and runners having swivel connection with the end-gate and sliding connection with said levers and formed with extensions to engage with the aforesaid guide-bars and prevent spreading of the sides of the wagon-body, substantially as specified.

3. In combination with a wagon-body and an end-gate therefor, guide-bars secured to the sides of the wagon-body near their rear ends, hooks attached to the upper end of the gate and adapted to engage with the said guide-bars, headed studs provided at the lower end of the gate to coöperate with curved slots formed in the lower ends of the said guide-bars, levers pivotally connected with the wagon-body and having hooked portions at their free ends and bent portions at their pivotal ends, runners having swivel connection with the end-gate and sliding connection with said levers and formed with extensions to coöperate with the the aforementioned guide-bars, catches to hold the levers in a given position, and clips applied to the upper end of the gate and adapted to coöperate with the guide-bars to prevent spreading of the sides of the wagon-body, substantially as set forth.

In testimony whereof I affix my signature in presence of two witnesses.

NORMAN I. MILLIKEN. [L. S.]

Witnesses:
H. W. PRENTICE,
WM. O. DUNANT.